United States Patent
Suzuki et al.

(10) Patent No.: US 10,848,923 B2
(45) Date of Patent: Nov. 24, 2020

(54) USER LOCATION INFORMATION DETECTION AND TRACKING SYSTEM

(71) Applicant: NOMURA RESEARCH INSTITUTE, LTD., Tokyo (JP)

(72) Inventors: Motoki Suzuki, Tokyo (JP); Taro Morioka, Tokyo (JP); Akira Arai, Tokyo (JP); Hiroyuki Nakamura, Tokyo (JP)

(73) Assignee: NOMURA RESEARCH INSTITUTE, LTD., Tokyo (JP)

( * ) Notice: Subject to any disclaimer, the term of this patent is extended or adjusted under 35 U.S.C. 154(b) by 0 days.

(21) Appl. No.: 16/817,703

(22) Filed: Mar. 13, 2020

(65) Prior Publication Data

US 2020/0314596 A1 Oct. 1, 2020

(30) Foreign Application Priority Data

Mar. 27, 2019 (JP) .................................. 2019-060646

(51) Int. Cl.
*H04W 4/029* (2018.01)
(52) U.S. Cl.
CPC .................................. *H04W 4/029* (2018.02)
(58) Field of Classification Search
CPC .............................. H04W 4/029; H04L 69/18
See application file for complete search history.

(56) References Cited

U.S. PATENT DOCUMENTS

| | | | |
|---|---|---|---|
| 2009/0179742 A1 | 7/2009 | Takeshima et al. | |
| 2009/0261949 A1* | 10/2009 | Hara | G06K 7/0008 340/10.1 |
| 2011/0195701 A1* | 8/2011 | Cook | G01S 5/0018 455/422.1 |
| 2014/0149033 A1* | 5/2014 | Moosavi | G01C 21/206 701/430 |

FOREIGN PATENT DOCUMENTS

JP 2008-217496 A 9/2008

* cited by examiner

*Primary Examiner* — Joseph E Dean, Jr.
(74) *Attorney, Agent, or Firm* — Rankin, Hill & Clark LLP

(57) ABSTRACT

A user location information detection and tracking system includes an IC tag that a user can carry, a user terminal configured to receive identification information outputted from the IC tag, a magnetic field device configured to form a magnetic field in a predetermined area, and a managing device communicably connected to the user terminal. The IC tag outputs at a predetermined timing, as the identification information, tag ID for identifying the IC tag, in response to detection of the magnetic field formed by the magnetic field device, the IC tag outputs, as the identification information, magnetic field identification information for identifying the magnetic field, and in response to the identification information received from the IC tag, the user terminal sends the identification information to the managing device.

4 Claims, 6 Drawing Sheets

USER LOCATION INFORMATION DETECTION AND TRACKING SYSTEM

BACKGROUND

Technical Field

The present invention relates to a system for detecting and tracking a location or movement of a user who carries, for example, a smartphone or an IC tag.

Related Art

Detection of locations or movements of users has been commonly made to make good use of the detection for analyzing trends in users and for providing service to users.

This kind of detection of locations or movements of users can be achieved, for example, by obtaining location information from electronic devices such as smartphones or IC tags carried by the users.

For example, JP 2008-217496 A proposes a tag detecting system in which a plurality of antennas for generating high frequency magnetic fields is disposed and a location or movement direction of an RFID is detected in response to a movement of a user carrying the RFID.

SUMMARY

However, there is still room for improvement in the technology disclosed in JP 2008-217496 A.

The present invention has been proposed in order to solve a problem of the conventional technology as described above, and therefore, an object of an embodiment of the present invention is to provide a user location information detection and tracking system with high convenience and reliability which is capable of detecting and tracking a location or movement of a user by reliably obtaining location information of the user independent of whether the user stays inside or outside and is capable of detecting and finding a lost item that the user has lost or left by accident.

In order to achieve the above-described object, according to the present invention, there is provided a user location information detection and tracking system including a tag that a user can carry, a user terminal configured to receive identification information outputted from the tag, a magnetic field device configured to form a magnetic field in a predetermined area, and a managing device communicably connected to the user terminal, in which the tag outputs at a predetermined timing, as the identification information, tag identification information for identifying the tag, in response to detection of the magnetic field formed by the magnetic field device, the tag outputs, as the identification information, magnetic field identification information for identifying the magnetic field, and in response to the identification information received from the tag, the user terminal sends the identification information to the managing device.

The present invention can be implemented as a user location information detection and tracking program executed by an information processing device included in the user location information detection and tracking system according to the present invention.

Further, the present invention can be also implemented as a user location information detection and tracking method that is executable by the user location information detection and tracking system and program according to the present invention.

According to the present invention, independent of whether the user stays inside or outside, it is possible to detect and track a location or movement of the user by reliably obtaining location information of the user, and to detect and find a lost item that the user has lost or left by accident.

Thereby, the user location information detection and tracking system with high convenience and reliability can be provided.

DETAILED DESCRIPTION

Hereinafter, an embodiment of a user location information detection and tracking system according to the present invention will be described with reference to the drawings.

Here, the user location information detection and tracking system of the present invention shown below is obtained by processes, means, and functions which are executed by a computer under instructions from a program (software). The program sends a command to each constituent element of the computer, so that predetermined processing, functions, or the like according to the present invention can be performed. That is each piece of processing, each means, or each function according to the present invention is achieved by specific means in which the program and the computer cooperate.

Note that the entirety or part of the program is provided by, for example, a magnetic disk, an optical disc, a semiconductor memory, or any computer-readable recording medium. The program read from the recording medium is installed on the computer so that the program is executed. The program can be directly loaded on the computer through a communication line with no recording medium so that the program can be executed. Further, the user location information detection and tracking system according to the present invention can be configured by a single information processing apparatus (e.g. a single personal computer, a smart phone), and can be also configured by more than one information processing apparatus (e.g. more than one server computer).

[System Configuration]

Figure 1:
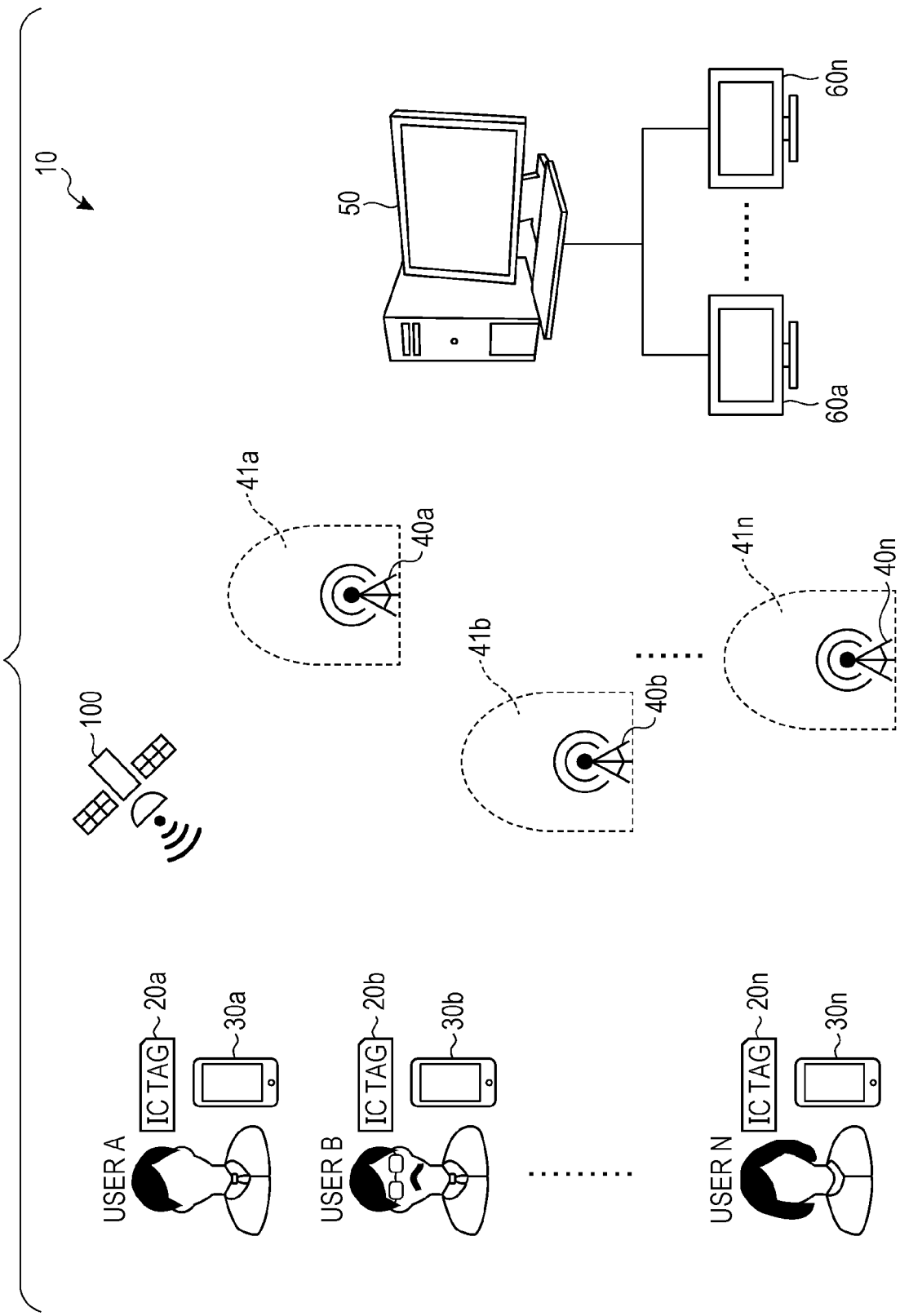
FIG. 1 is a block diagram showing the overall configuration of a user location information detection and tracking system according to an embodiment of the present invention.

FIG. 1 shows the overall configuration of a user location information detection and tracking system 10 according to an embodiment of the present invention (hereinafter, referred to as the "present system 10").

The present system 10 shown in FIG. 1 includes an IC tag 20 (20a, 20b, . . . , and 20n) that one or more users A, B, . . . and N can carry respectively, a user terminal 30 (30a, 30b, . . . , and 30n) capable of receiving identification information outputted from the IC tag 20, one or more magnetic field devices 40 (40a, 40b, . . . , and 40n) that form a magnetic field 41 (41a, 41b, . . . , and 41n) within a predetermined area, and a managing device 50 communicably connected to the user terminal 30.

The managing device 50 is configured to be communicably connected to one or more client devices 60 (60a, 60b, . . . , and 60n).

[IC Tag 20]

The IC tag 20 is a small signal transmitter that the user can carry, and the IC tag 20 outputs at a predetermined timing, as the identification information, a tag ID serving as tag identification information with which the subject IC tag is identifiable.

When detecting the magnetic field 41 generated by the magnetic field device 40, the IC tag 20 outputs, as the identification information, a magnetic field ID serving as magnetic field identification information with which the detected magnetic field is identifiable.

Figure 2:
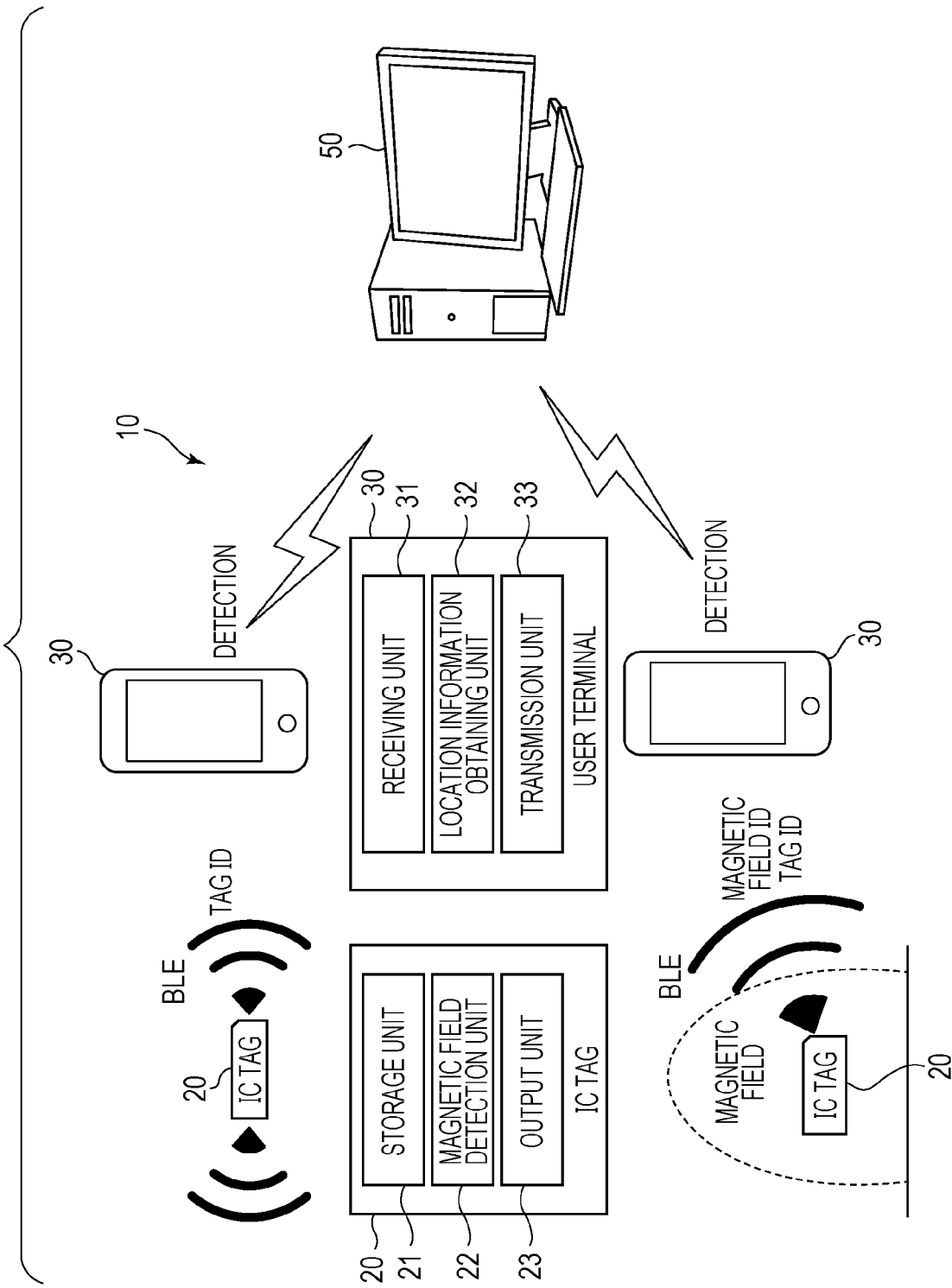
FIG. 2 is a block diagram showing the functional configuration of an IC tag and a user terminal of the present system.

Specifically, as shown in FIG. 2, the IC tag 20 includes a storage unit 21 for storing, therein, the tag ID serving as the identification information, a magnetic field detection unit 22 for detecting a magnetic field, and an output unit 23 for outputting and delivering the tag ID and the magnetic field ID both serving as the identification information.

In the IC tag 20 having such a configuration, the output unit 23 externally outputs and delivers the tag ID, serving as the identification information, stored in the storage unit 21 at a predetermined timing (once every few seconds, for example).

The tag ID herein is information with which the IC tag 20 is identifiable. The tag ID is, for example, an identification number uniquely given to each of the IC tags 20, and may include a user name and an user ID for identifying a user who is an owner of the subject IC tag 20.

In the IC tag 20, when the magnetic field detection unit 22 detects a magnetic field, a magnetic field ID, of the magnetic field, for identifying that magnetic field is received, and the output unit 23 outputs and transmits the magnetic field ID externally together with the tag ID at a predetermined timing (once every few seconds while the magnetic field ID is received, for example).

The magnetic field ID herein is information with which the magnetic field device 40 and the magnetic field 41 are identifiable, and is, for example, an identification number uniquely given to each of the magnetic field devices 40 and the magnetic field 41, location information on a place where the magnetic field device 40 is disposed, and so on. Such a magnetic field ID can be implemented by a magnetic signal of the magnetic field 41 generated by the magnetic field device 40.

The signal (identification information) outputted from the IC tag 20 described above can be received within a predetermined area (several tens of meters in radius, for example), and, in this embodiment, can be received with a receiving function of the user terminal 30 carried by each user.

This enables the user terminal 30 carrying the IC tag 20 to receive, all the time, the identification information (tag ID, magnetic field ID) outputted from the IC tag 20. In a case where the IC tag 20 that the user, who is the owner thereof, has lost or left by accident is in a bag or wallet that is a lost item for example, another user terminal 30 carried by another user near the IC tag 20 receives the identification information. This enables location information of the user to be detected and tracked through the managing device 50 and enables predetermined lost item information to be conveyed to the user who is the owner of the IC tag 20 lost.

Although not particularly shown in the drawings of the present embodiment, a receiving device (antenna, for example) with which the IC tag 20 can receive output information is installed in predetermined indoor and outdoor locations. This enables not only the user terminal 30 but also the receiving device to receive the identification information outputted from the IC tag 20, leading to detection of the location information of the user and detection of a lost item more reliably.

A known tag can be used as the IC tag 20 described above, and in the present embodiment, a Bluetooth low energy (BLE) tag for transmitting a beacon signal of BLE can be used as the IC tag 20. The BLE tag is configured of a tag that has a side length of a few centimeters or so and contains a small BLE transmitter therein. The BLE tag is held directly by the user or is put in or attached to an outer pocket, a bag, or a wallet, in other words, the BLE tag has a portable configuration and shape.

The outer shape or the like of the IC tag 20 is not particularly limited as long as the IC tag 20 can be carried by the user and contains the BLE transmitter therein. The IC tag 20 can have various shapes and designs such as a tag-shape, a card-shape, or a phone strap-shape.

For example, a company or organization that is to operate the present system 10 to provide customer service, etc. can pass out the IC tag 20 of this kind to users as potential customers or members with or without charge.

It is possible to store, in the IC tag 20 passed out to customers, as the information to be stored in the storage unit 21, the identification information (for example, user ID, membership number, or the like) of the user who is to receive the IC tag 20 in correlation with the tag ID.

[User Terminal 30]

The user terminal 30 is an information processing device that has a wireless communication function and is operable by a user of the present system 10 (for example, a customer, employee, staff, or student). The user terminal 30 is implemented by, for example, a smartphone, a tablet terminal, or a mobile phone. The user terminal 30 is configured to receive the identification information outputted from the IC tag 20 and perform wireless communication with the managing device 50, for example, over a public transportation network or WiFi.

Specifically, as shown in FIG. 2, the user terminal 30 includes a receiving unit 31 serving as receiving means capable of receiving the identification information (tag ID or magnetic field ID) outputted from the IC tag 20, and a transmission unit 33 serving as transmission means for sending the identification information to the managing device 50 when receiving the identification information from the IC tag 20.

The user terminal 30 also includes a location information obtaining unit 32 serving as location information obtaining means capable of obtaining the location information of the user terminal 30 from a global positioning system (GPS: refer to a GPS 100 of FIG. 1), and is configured to, in response to the location information obtained from the GPS outside, send the location information together with the identification information from the transmission unit 33 to the managing device 50.

Each of the functions of the receiving unit 31, the location information obtaining unit 32, and the transmission unit 33 of the user terminal 30 can be used and executed as a function provided by an application programming interface (API) of the managing device 50 through a predetermined application program (application) installed on a smartphone implementing the user terminal 30. For example, a simple server-client model between the managing device 50 and the user terminal 30 can be established, so that each of the functions of the receiving unit 31, the location information obtaining unit 32, and the transmission unit 33 of the user terminal 30 can be implemented in the user terminal 30.

In the user terminal 30 as described above, when the receiving unit 31 receives the identification information from the IC tag 20, through control on the application, without specific input operation or the like by the user, the received identification information on the IC tag 20 is automatically sent from the transmission unit 33 to the managing device 50 at a predetermined timing (for example, every time when the identification information from the IC tag 20 is received).

In a case where the identification information from the IC tag 20 does not include the magnetic field ID of the magnetic field device 40, location information of the GPS obtained by the location information obtaining unit 32 is read out, and the location information is automatically sent at a predetermined timing together with the identification information (tag ID) of the IC tag 20 toward the managing device 50, without specific input operation or the like by the user. This allows automatic transmission and provision of the identification information obtained by the IC tag 20 and the location information from the GPS toward the managing device 50 without particular awareness of the user of the user terminal 30. This provides a highly-convenient system which does not trouble the user.

The user terminal 30 having the functions described above is carried by each of the users. This allows the identification information outputted from the IC tag 20 to be received and detected in each of the user terminals 30 held by all the users of the present system 10 including the owner of the IC tag 20.

Thereby, in the case of the IC tag 20 that the user, who is the owner thereof, has lost or left by accident, a different user terminal 30 receives the identification information on the IC tag 20, which enables lost item information to be conveyed through the managing device 50.

[Magnetic Field Device 40]

The magnetic field device 40 is a device functioning as magnetic field generation means for forming a magnetic field within a predetermined area, and can be implemented by a known magnetic field generating device, a magnetic field generator, and the like.

The magnetic field device 40 is capable of generating, in any space, a magnetic field 41 having a desired size within an area of a few centimeters to several tens of meters. As shown in FIGS. 1 and 2, for example, the magnetic field 41 having an oval shape (circle shape) can be formed in a surface on which the magnetic field device 40 is installed.

The magnetic field device 40 forming such a magnetic field 41 is installed in a plurality of predetermined indoor and outdoor locations. Thereby, the IC tag 20 carried by the user, who has entered the area of each of the magnetic fields 41, detects the magnetic field, so that the magnetic field ID, of the magnetic field, for identifying that magnetic field is received and the magnetic field ID is sent from the IC tag 20 through the user terminal 30 to the managing device 50. This allows for capturing and monitoring of, as the magnetic field ID, location information of the user carrying the IC tag 20 (user terminal 30) and location information of the IC tag 20 that the user has lost or left by accident.

Figure 4:
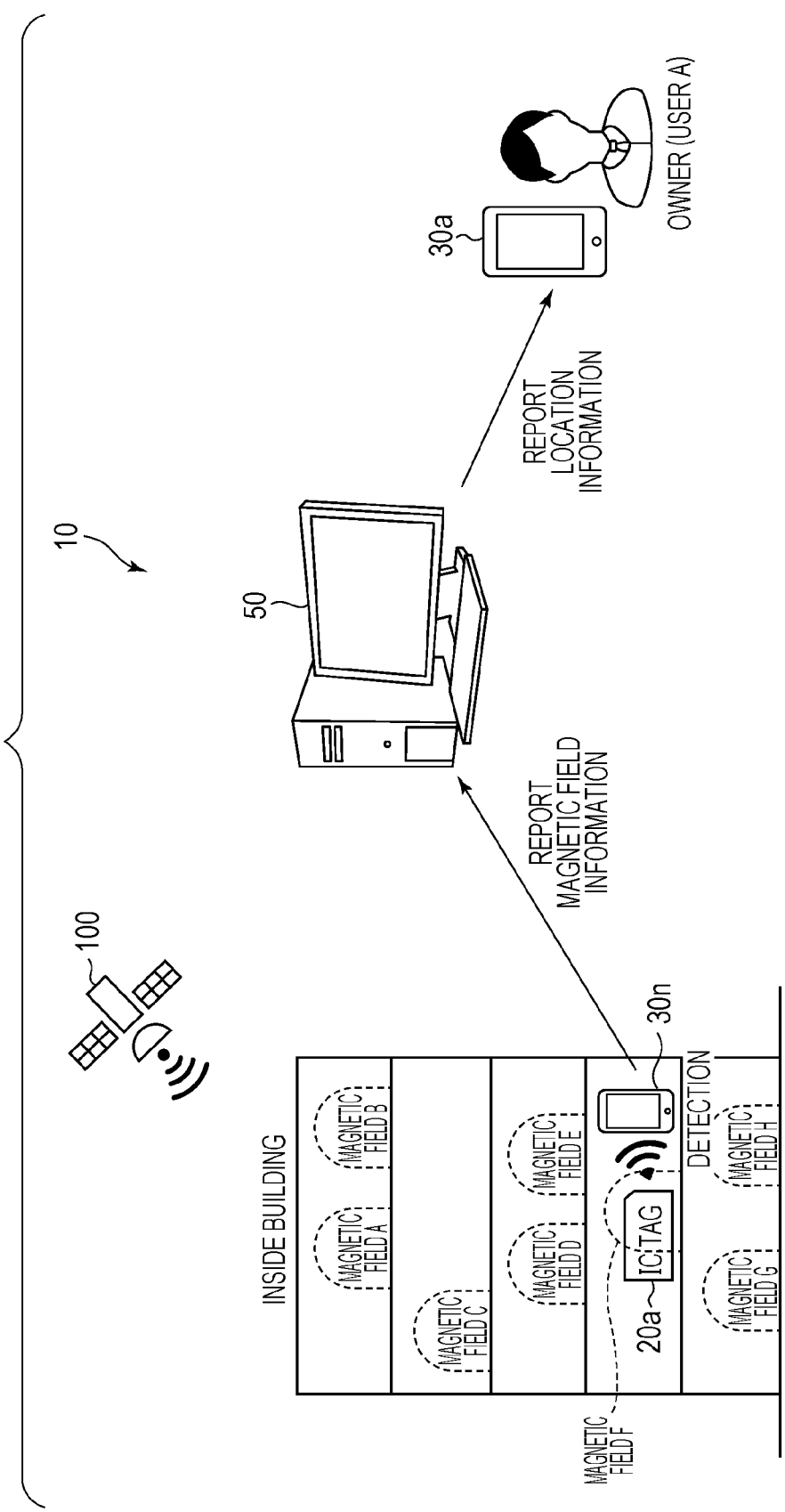
FIG. 4 is an explanatory diagram for a case where the present system obtains and detects location information of a user who stays inside.

Even in a case where the user or the IC tag 20 is indoors (in a building, underground walkway, tunnel, or the like) and obtaining, by the user terminal 30, location information from the GPS is impossible, providing the magnetic field device 40 enables the IC tag 20 to detect the magnetic field ID of the magnetic field device 40 disposed in the building, to send the magnetic field ID to the managing device 50, and to determine a location of the IC tag 20 (user terminal 30) in the building as three-dimensional location information including a position in the height direction of the building (floor position) (see FIG. 4).

In the present system 10, therefore, the user carrying the IC tag 20 can send location information to the managing device 50 independent of whether the user stays inside or outside, which makes it possible to monitor high-reliable location information of the user and early detect a lost item that the user has lost or left by accident.

[Managing Device 50]

The managing device 50 is an information processing device that performs wireless communication with the user terminal 30 to provide the user terminal 30 with a function of the present system 10.

Specifically, the managing device 50 can be implemented by, for example, an information processing device such as one or more server computers or a server system including one or more virtual servers built on a cloud computing service.

The managing device 50 includes a non-illustrated operating system (OS) and database management system (DBMS) functioning as a storage unit, and is configured to operate as a server computer.

The managing device 50 includes an API implemented as software operating on middleware such as a web server program, and the API can publish and provide an application usable in the API to one or more user terminals 30 via a network such as an intranet or the Internet.

The managing device 50 establishes a server-client model with the user terminal 30 and causes the user terminal 30 to execute the functions of the receiving unit 31, the location information obtaining unit 32, and the transmission unit 33 that can use the present system 10.

This allows, in each of the user terminals 30, transmission of the identification information on the IC tag 20 and reception of the lost item information using an application program for user location information detection and tracking of the present system 10.

Figure 3:
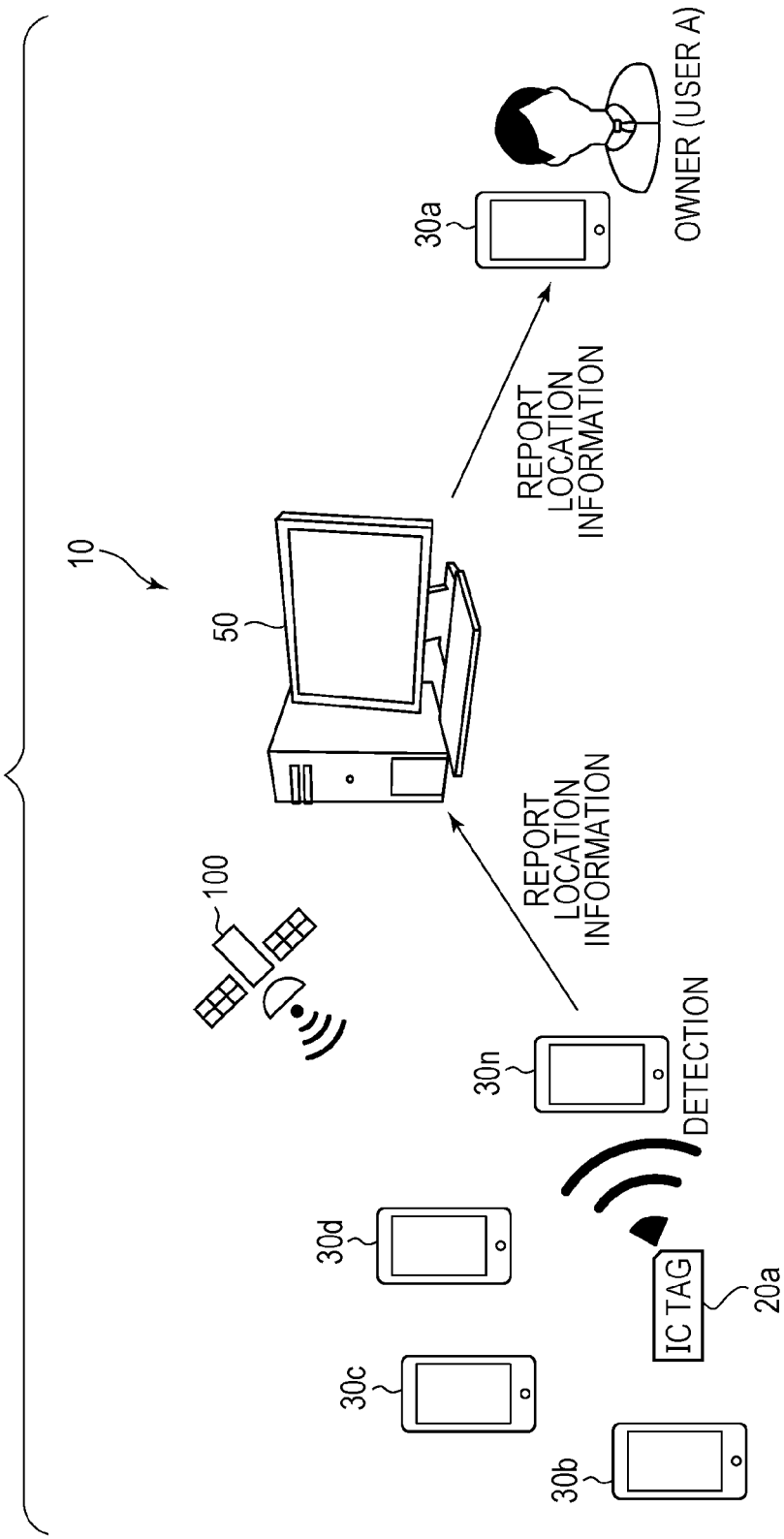
FIG. 3 is an explanatory diagram for a case where the present system obtains and detects location information of a user who stays outside.

With the managing device 50, in a case where the user or the IC tag 20 is outdoors, as shown in FIG. 3, the user terminal 30 (user terminal 30*n* in FIG. 3) that has received the identification information on the IC tag 20 obtains the location information of the subject user terminal 30*n* from the GPS 100, and the obtained location information and the identification information on the IC tag 20 are sent to the managing device 50.

This enables the managing device 50 to determine which part of the outdoors the IC tag 20 (user terminal 30) is present on the basis of the location information of the GPS 100.

In a case where the user or the IC tag 20 is in a building and the user terminal 30 is not capable of obtaining the location information from the GPS 100, as shown in FIG. 4, the IC tag 20 detects a magnetic field ID of any of the magnetic fields A to H formed by the magnetic field device 40 installed in the building, and the user terminal 30 (user terminal 30n in FIG. 4) that has received the magnetic field ID from the IC tag 20 sends, to the managing device 50, identification information including the magnetic field ID showing the position of the magnetic field.

This enables the managing device 50 to determine which part of the building the IC tag 20 (user terminal 30) is present in the form of three-dimensional location information including the position (floor position) of the building in the height direction.

The managing device 50 determines and manages the location information of the IC tag 20 as described above, thereby as shown in FIGS. 4 and 5, even when a user A has lost or left the IC tag 20a by accident (lost item, left item, and the like) for example, the user terminals 30b to 30n carried by other users obtain the location information of the IC tag 20a and send the same to the managing device 50, which enables the managing device 50 to determine the location of the IC tag 20a.

The managing device 50 then provides the user terminal 30a of the user A, who is the owner of the IC tag 20a and has lost or left the IC tag 20a by accident, with predetermined lost item information including the location information of the IC tag 20a found out.

The lost item information provided to the user terminal 30 includes notification that a lost item including the IC tag 20 has been found out and location information on a place where the IC tag 20 has been found out.

Such notification of the lost item information can be sent from the managing device 50 via electronic mail, or alternatively, push notification can be sent on an application of the user terminal 30.

[User Information]

Further, as shown in FIG. 1, the managing device 50 is communicably connected to the one or more client devices 60 (60a, . . . , and 60n). The managing device 50 is so configured that, when receiving the identification information on the IC tag 20 from the user terminal 30, the managing device 50 sends predetermined user information correlated with that user terminal 30 to the corresponding client device 60.

The managing device 50 is configured to store and manage, in a storage unit (not shown), predetermined user information on a user of the present system 10 in correlation with the identification information on the IC tag 20 and the user terminal 30.

The user information herein may include, for example, identification information or attribute information on a user who is a potential customer or member to whom a company or organization is to provide customer service or the like by operating the present system 10.

The user information includes, for example, identification information for identifying the corresponding user (name, address, telephone number, user ID, password, membership number, email address, and so on) and attribute information showing attributes of the corresponding user (purchase history information, store visit information, customer rank information, and so on).

The managing device 50 is configured to record, therein, such user information in correlation with the identification information (tag ID) of the IC tag 20.

Thereby, the managing device 50 is configured to receive the identification information and the location information of the IC tag 20 from the user terminal 30, extract user information stored in correlation with the IC tag 20, and send the user information to a predetermined client device 60.

[Client Device 60]

The client device 60 is implemented by an information processing device such as a personal computer, a tablet terminal, or a smartphone installed in shops and so on operated by a company or an organization that operates the present system 10 to provide customer service and so on. The client device 60 is configured to be used for providing a user having come or visited shops and the like with necessary service, for selling products to such a user, and so on.

The client device 60 described above is configured to receive predetermined user information sent from the managing device 50 and use the received user information to provide service to users, serve the users, and sell products.

When receiving the identification information and the location information of the IC tag 20 from the user terminal 30, the managing device 50 can send the whole or a part of the user information stored in correlation with the IC tag 20 to the client device 60 installed in a building, shop, or facility located in a position (address) at which the IC tag 20 is currently present or a position close thereto.

This enables the client device 60 having received the user information to identify a user carrying the IC tag 20 corresponding to the user information, and to provide service to the user or serve the user on the basis of the user information.

For example, the client device 60 can provide service specialized for the user (so-called hospitality, or the like) on the basis of the identification information and the attribute information shown in the user information. Such specialized service includes, for example, serving or speaking to a royal customer preferentially, applying a discount preferentially to the royal customer, proposing a recommended item to the royal customer, and giving a coupon to the royal customer.

[Operation]

Figure 5:
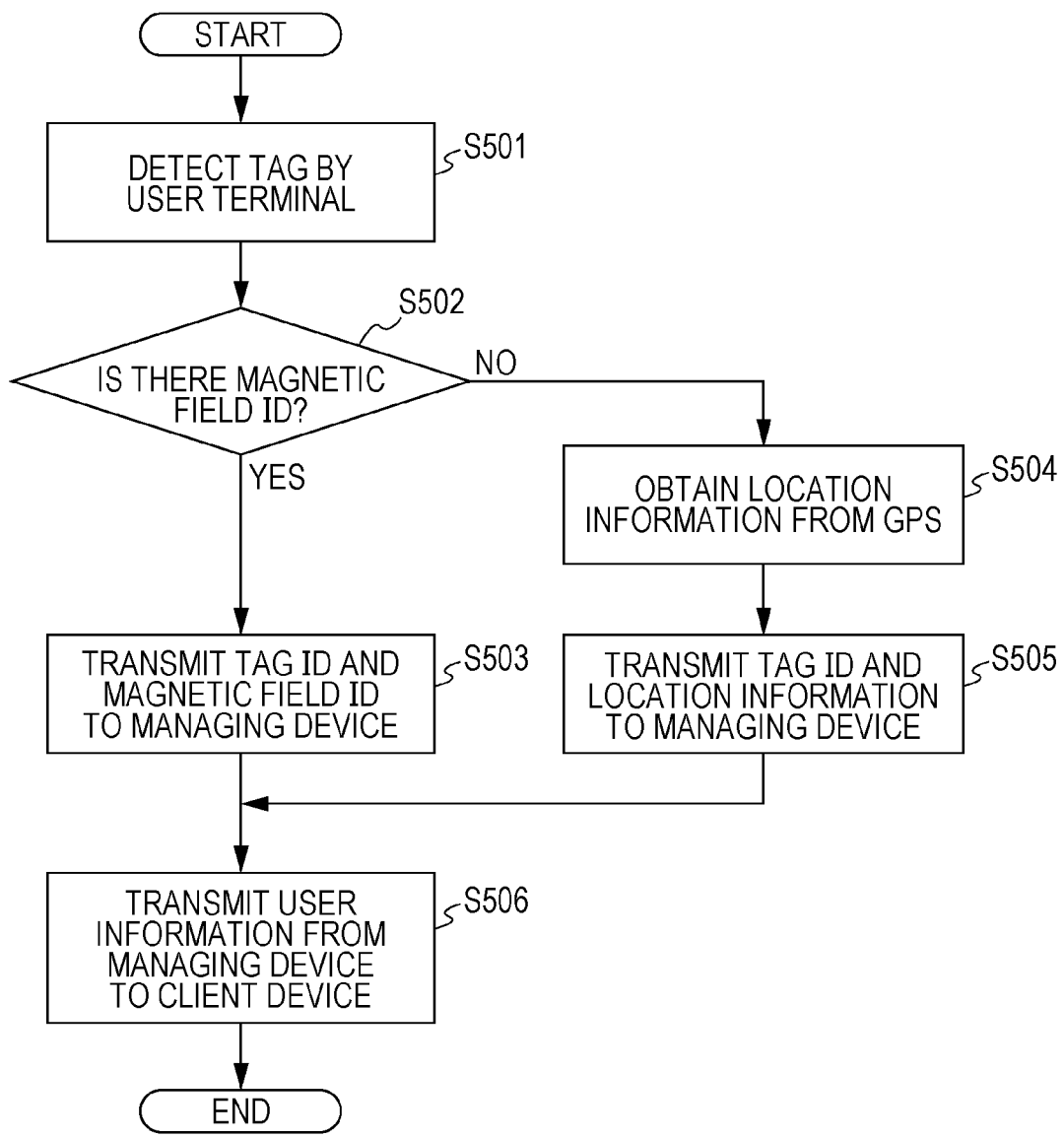
FIG. 5 is a flowchart depicting processing operation for a case where the present system detects location information of a user to provide a client device with predetermined user information.
Figure 6:
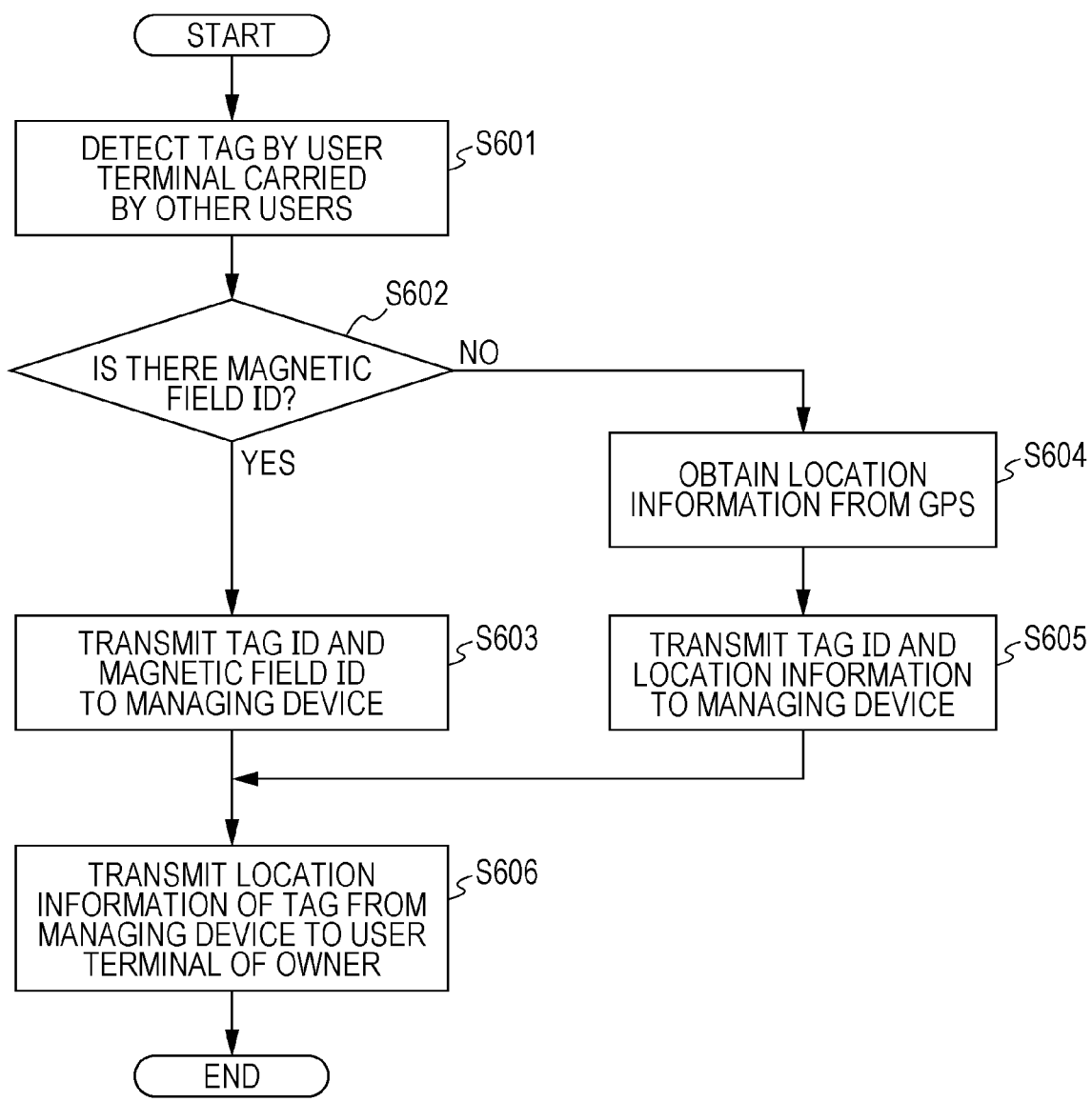
FIG. 6 is a flowchart depicting processing operation for a case where the present system detects location information of an IC tag that the user has lost or left by accident to provide notification to a terminal of the user who is an owner of the IC tag.

The description goes on, with reference to flowcharts of FIGS. 5 and 6, to specific operation (user location information detection and tracking method) of the present system 10 having the configuration described above.

FIG. 5 depicts processing operation for a case where the present system 10 detects location information of a user to provide predetermined user information to the client device 60.

In the IC tag 20 and the user terminal 30 carried by each user of the present system 10, the IC tag 20 outputs a tag ID serving as the identification information at a predetermined timing (once every few seconds, for example), and the user terminal 30 detects the tag ID all the time (step S501).

When the user walks and moves to an area of the magnetic field 41 formed by the magnetic field device 40, the IC tag 20 detects the magnetic field 41 to receive a magnetic field ID, and the received magnetic field ID is outputted at a predetermined timing (for example, once every few seconds while the magnetic field ID is received), and is received and detected by the user terminal 30 (Yes in step S502).

The user terminal 30 receives the tag ID and the magnetic field ID from the IC tag 20, and sends the tag ID and the magnetic field ID via a wireless communication network to the managing device 50 (step S503).

In contrast, in a case where the IC tag 20 does not detect the magnetic field 41 formed by the magnetic field device 40 because the user stays outside, or the like (No in step S502), the user terminal 30 obtains location information from the GPS 100 (step S504), and sends the location information and the tag ID received from the IC tag 20 to the managing device 50 via the wireless communication network (step S505).

Transmission of the identification information on the IC tag 20 and the location information of the GPS 100 from the user terminal 30 to the managing device 50 is automatically carried out through control on the application implemented in the user terminal 30 without specific input operation or the like by the user.

The processing operation described above is repeated, so that the location information of the user carrying the IC tag 20 and the user terminal 30 is sent toward the managing device 50 all the time, which enables monitoring the location and movement of the user.

Further, when receiving the identification information and the location information of the IC tag 20 from the user terminal 30, the managing device 50 extracts, from the storage unit, predetermined user information stored in correlation with the IC tag 20 of the received tag ID and sends necessary information to a predetermined client device 60 (step S506).

For example, the managing device 50 can send the user information stored in correlation with the IC tag 20 to the client device 60 installed in a shop or facility located in a position at which the IC tag 20 whose tag ID has been received is present or a position close thereto.

The managing device 50 sends the user information as described above, which enables the client device 60 having received the user information to identify a user carrying the IC tag 20 corresponding to the user information, and to provide service to the user or serve the user on the basis of the user information.

The foregoing processing operation is repeated; thereby, even when the user carrying the IC tag 20 and the user terminal 30 moves, the location of the movement destination of the user is determined on the managing device 50 side, which allows for providing appropriate user information to another client device 60 of the movement destination.

In FIG. 6, a processing operation for a case where the present system 10 detects location information of an IC tag 20 that the user has lost or left by accident to provide notification to a terminal 30 of the user who is an owner of the IC tag 20.

As shown in FIG. 4 or FIG. 5, suppose that a user A has dropped his/her own IC tag 20a somewhere and does not know where he/she has dropped the IC tag 20a.

In such a case, since the IC tag 20a that the user A has dropped outputs a tag ID at a predetermined timing (once every few seconds, for example), any of the user terminals 30b to 30n carried by other users who are around the IC tag 20a that the user A has dropped detects the tag ID outputted by the IC tag 20a (step S601).

In a case where the IC tag 20a drops within an area of the magnetic field 41 formed by the magnetic field device 40, the IC tag 20a detects the magnetic field 41 to receive the magnetic field ID, and the magnetic field ID is outputted at a predetermined timing (for example, once every few seconds while the magnetic field ID is received). This allows any of the user terminals 30b to 30n carried by other users who are around the IC tag 20a to detect the magnetic field ID outputted by the IC tag 20a (Yes in step S602).

The user terminal 30n carried by another user receives the tag ID and the magnetic field ID, and sends the received tag ID and magnetic field ID to the managing device 50 via the wireless communication network (step S603).

In contrast, in a case where the IC tag 20a does not detect the magnetic field 41 formed by the magnetic field device 40 because the IC tag 20a is dropped outside, or the like (No in step S602), the user terminal 30n of other users who detected the tag ID from the IC tag 20a obtains location information from the GPS 100 (step S604), and sends the location information and the tag ID received from the IC tag 20a to the managing device 50 via the wireless communication network (step S605).

Transmission of the identification information on the IC tag 20 and the location information of the GPS 100 from the user terminal 30n to the managing device 50 is automatically carried out through control on the application to be executed in the user terminal 30n without input operation or the like by the user.

Through the foregoing processing operation, the identification information and the location information of the IC tag 20a that the user A, who is the owner thereof, has lost or left by accident is detected by the user terminal 30 carried by any of users of the present system 10, and the location information of the found IC tag 20a is sent toward the managing device 50.

The managing device 50 which received the identification information and the location information of the IC tag 20a then provides the user terminal 30a of the user A, who is the owner of the IC tag 20a and has lost or left the IC tag 20a by accident, with predetermined lost item information including the location information of the IC tag 20a found out (step S606).

According to this arrangement, even if the owner user A does not attempt to find out the IC tag 20a that the user A has dropped, a bag, purse or the like where the user A puts the IC tag 20a, the user terminal 30 carried by each of the users of the present system 10 detects and finds out the same. This enables providing a highly-convenient lost item search and detection system for all the users of the present system 10.

As described above, in the present system 10 according to the present embodiment, the user terminal 30 automatically sends, to the managing device 50, the identification information transmitted from the IC tag 20 carried by the user at a predetermined timing, which enables the managing device 50 to always monitor, determine, and manage the location and movement of the user carrying the IC tag 20 and the user terminal 30.

In response to detection of the magnetic field 41 formed by the magnetic field device 40, the IC tag 20 can send the identification information (magnetic field ID) for identifying the magnetic field 41 toward the managing device 50. Thus, even when the user terminal 30 is indoors, in an underground walkway, or a tunnel where location information from the GPS 100 cannot be obtained, the location and movement of the user carrying the IC tag 20 and the user terminal 30 can be monitored and determined as the location information of the IC tag 20, as long as the magnetic field 41 can be detected.

The identification information on the IC tag 20 can be received and detected not only by the owner of that IC tag 20 but also by the user terminal 30 of each user of the present system 10. For example, the IC tag 20 that the owner user has lost or left by accident can be detected by the user terminal 30 possessed by another user, and predetermined lost item information including the location information can be provided to the user terminal 30 of the owner user through the managing device 50.

Thereby, in the present system 10, independent of whether the user stays inside or outside, it is possible to detect and track a location and movement of the user by reliably obtaining location information of the user, and to early detect and find a lost item that the user has lost or left by accident.

Thus, a user location information detection and tracking system with high convenience and reliability can be provided.

In contrast, in the system such as that disclosed in JP 2008-217496 A, for example, a specific person having an RFID is merely detected, and it is impossible to detect location information of a plurality of users independent of whether the users stay inside or outside and also impossible to detect, by all other users, location information of a lost item of a specific user, which makes it impossible for the system of JP 2008-217496 A to provide the foregoing remarkable operational advantage of the present system 10.

The preferred embodiment of the present invention has been described above, but the present invention is not limited to the embodiment described above. Needless to say, various changes can be made without departing from the scope of the present invention.

For example, targets in which the user location information detection and tracking system according to the present invention is introduced and operated can be any facility as long as monitoring and determining location information of users visiting the facility or shop is requested, for example, the targets can be a large commercial facility, a retail shop, a hotel, a department store, a school, a station, and an airport.

The managing device of the present system can be implemented by an information processing device possessed and operated by a shop or facility where the present system is introduced. The managing device of the present system can be also implemented by an information processing device and the like installed in a system integrator company that merely manages and operates location information of users and user information by using the managing device, for example, provides the present system as business process outsourcing (BPO) service.

The present invention is appropriately applicable to a system that, for example, analyzes a consumption trend of users, and supports providing scrupulous service to users and providing hospitality to royal customers, and a system that supports searching for a lost item of a user.

What is claimed is:

1. A user location information detection and tracking system comprising:

a tag that a user can carry;

a user terminal configured to receive identification information outputted from the tag;

a magnetic field device configured to form a magnetic field in a predetermined area; and a managing device communicably connected to the user terminal, wherein the tag outputs at a predetermined timing, as the identification information, tag identification information for identifying the tag, in response to detection of the magnetic field formed by the magnetic field device, the tag outputs, as the identification information, magnetic field identification information for identifying the magnetic field, and in response to the identification information received from the tag, the user terminal sends the identification information to the managing device.

2. The user location information detection and tracking system according to claim 1, wherein the user terminal is configured to obtain location information of the user terminal, and in response to the location information obtained, the user terminal sends the location information together with the identification information to the managing device.

3. The user location information detection and tracking system according to claim 1 or 2, comprising a client device communicably connected to the managing device, wherein, the managing device, in response to the identification information received from the user terminal, sends predetermined user information correlated with the user terminal to the client device.

4. The user location information detection and tracking system according to claim 1 or 2, wherein, the managing device, in response to the identification information received from another user terminal different from a user terminal correlated with the identification information, sends predetermined lost item information to the user terminal correlated with the identification information.

\* \* \* \* \*